United States Patent [19]

Nye

[11] Patent Number: 5,515,203
[45] Date of Patent: May 7, 1996

[54] EDUCATIONAL LENS

[76] Inventor: William S. Nye, Chute 118, 8315 Lake City Way NE., Seattle, Wash. 98115

[21] Appl. No.: 273,012

[22] Filed: Jul. 8, 1994

[51] Int. Cl.$^6$ .................................................. G02B 3/12
[52] U.S. Cl. .................................................. 359/665
[58] Field of Search .................................. 359/665, 666, 359/667

[56] References Cited

U.S. PATENT DOCUMENTS

| | | | |
|---|---|---|---|
| 4,585,457 | 4/1986 | Kalb | 623/6 |
| 4,822,360 | 4/1989 | Deacon | 623/6 |
| 4,888,012 | 12/1989 | Horn et al. | 623/6 |
| 5,091,121 | 2/1992 | Nakada et al. | 264/1.4 |

*Primary Examiner*—Scott J. Sugarman
*Attorney, Agent, or Firm*—Miller, Nash, Wiener, Hager & Carlsen

[57] ABSTRACT

A collapsible lens designed to be used as an educational device is constructed from a pouch of polyethylene plastic that is shaped to form a convex lens when filled with water. The pouch has an edge region positioned adjacent and coextensive with a portion of the radial periphery of the pouch. The edge region has an inlet and outlet opening for use in filling and emptying the lens. The openings are closed by a channel-lock seam.

4 Claims, 3 Drawing Sheets

EDUCATIONAL LENS

TECHNICAL FIELD

The invention disclosed herein generally relates to optics. More particularly, it relates to the making and shaping of convex lenses for visually magnifying objects.

BACKGROUND INFORMATION

Modern statistics indicate that the education of American youth is falling behind the other industrialized nations of the world in matters relating to science. Many believe that this disturbing trend is a result of failure on the part of the American educational system to teach scientific concepts in a way that generates interest in science and demonstrates how science affects our daily lives.

Science is for everyone. All of us use and benefit from science. Nearly all scientific concepts, regardless of their theoretical or technical complexity, can be explained in terms that are easy to understand by anyone, including young children. Showing children the link between scientific concepts and the physical world in a meaningful way makes science interesting, and, consequently, encourages more children to pursue career opportunities in scientific fields.

I have a bachelor of science degree in mechanical engineering and worked as an engineer for ten years. During that time, I conducted science demonstrations for the public at the Pacific Science Center in Seattle, Wash.

I presently produce and star in an educational television show called "Bill Nye, The Science Guy.®" It has been seen by millions of viewers in syndication and on public broadcasting stations throughout the nation. An important part of my show involves the use of every-day household items to illustrate scientific principles and show children how they can perform simple experiments at home.

During the course of thinking of new ideas for a book and my show, it occurred to me that it is possible to create a very crude magnifying lens by filling a conventional Ziplock® plastic sandwich bag with water. Most Americans are very familiar with this type of bag as it is used to keep sandwiches fresh for lunchtime.

Obviously, the rectangular shape of the conventional plastic sandwich bag is not designed to mimic the curvature of a lens. Consequently, I created my own design borrowing from the sandwich bag concept. Without explaining complicated principles relating to wave optics, my design introduces the concept of refraction of light, as it passes through a lens, and lens focal length. At the same time, it is fun to use.

Certain features of my design are believed to be unique and patentable. These features, and their advantages, will become apparent upon reading the description set forth below.

SUMMARY OF THE INVENTION

The invention is a collapsible or flexible pouch made of a light-transparent material such as low-density polyethylene. The pouch has a pair of openings for filling it with water, or an equivalent light-transparent liquid, and subsequently emptying it. One opening functions as an inlet for filling the bag, while the other functions as an outlet permitting air to escape during the filling process. After the pouch is completely filled, both openings are closed, thus enabling the pouch to function as a lens.

The pouch has a substantially circular periphery, corresponding to the radial shape of a convex lens, and parabolically curved sidewalls that assume the convex shape when the pouch is filled. The inlet and outlet openings are made from a rectangular edge region which is coextensive with a portion of the pouch's radial periphery. The edge region has a single channel-lock seam extending along its length. The seam is permanently sealed in a central region. This divides the seam into two parts, thus creating the inlet and outlet openings.

Preferably, the sealed central region has a straight edge, and an angled edge which diverges from the straight edge. The angled edge causes one of the openings to converge from inside to outside of the pouch. This enables one of the openings to function as an outlet when the pouch is emptied.

BRIEF DESCRIPTION OF THE DRAWINGS

In the drawings, like reference numerals and letters fer to like parts throughout the various views, and wherein.

BEST MODE FOR CARRYING OUT THE INVENTION

Figure 1:
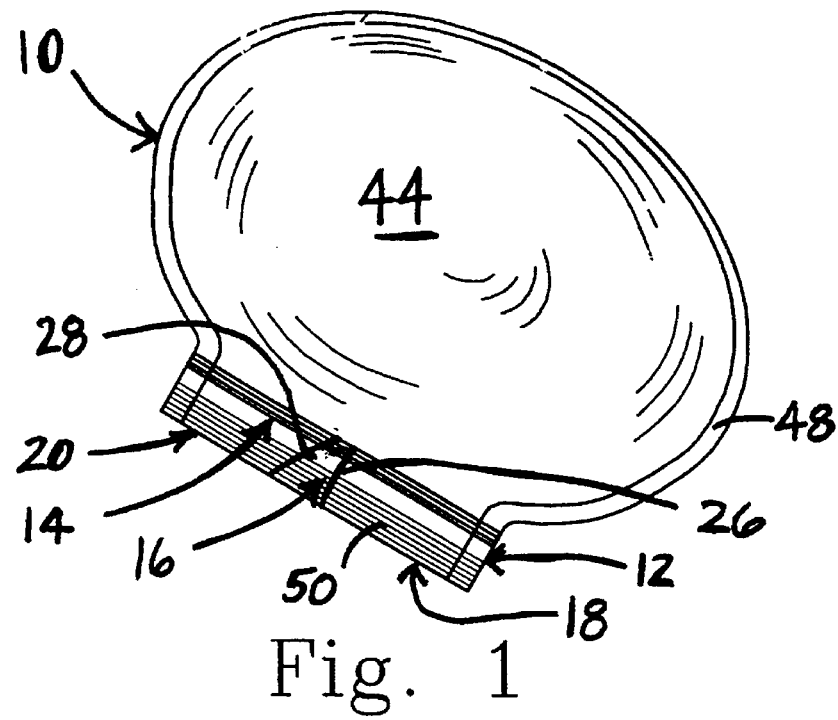
FIG. 1 is a pictorial view of a collapsible lens, constructed in accordance with the preferred embodiment of the invention, and shows the lens in a collapsed or empty condition.
Figure 5:
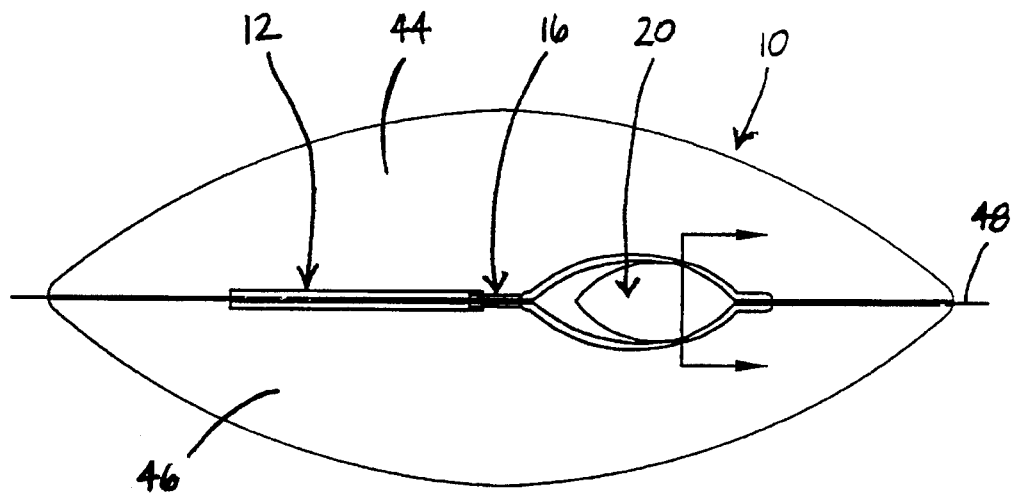
FIG. 5 is a side view of the lens, looking end-on at the inlet and outlet openings, and shows one of the openings in an open condition.

Referring now to the drawings, and first to FIG. 1, indicated generally at 10 is a collapsible lens, constructed in accordance with the preferred embodiment of my invention. As is apparent, the lens 10 is generally conventional in shape. As is best seen in FIG. 5, it is constructed from a plastic pouch that, when completely or substantially filled, assumes a convex cross-sectional shape.

A rectangular edge region 12 is located adjacent and coextensive with the radial periphery of the lens 10. The edge region 12 has a channel-lock seam 14 extending along its length. The seam is heat-sealed in a central region indicated at 16. This divides the seam into two openings: an inlet opening, indicated generally at 18; and an outlet opening, indicated generally at 20 (see FIG. 2).

Figure 2:
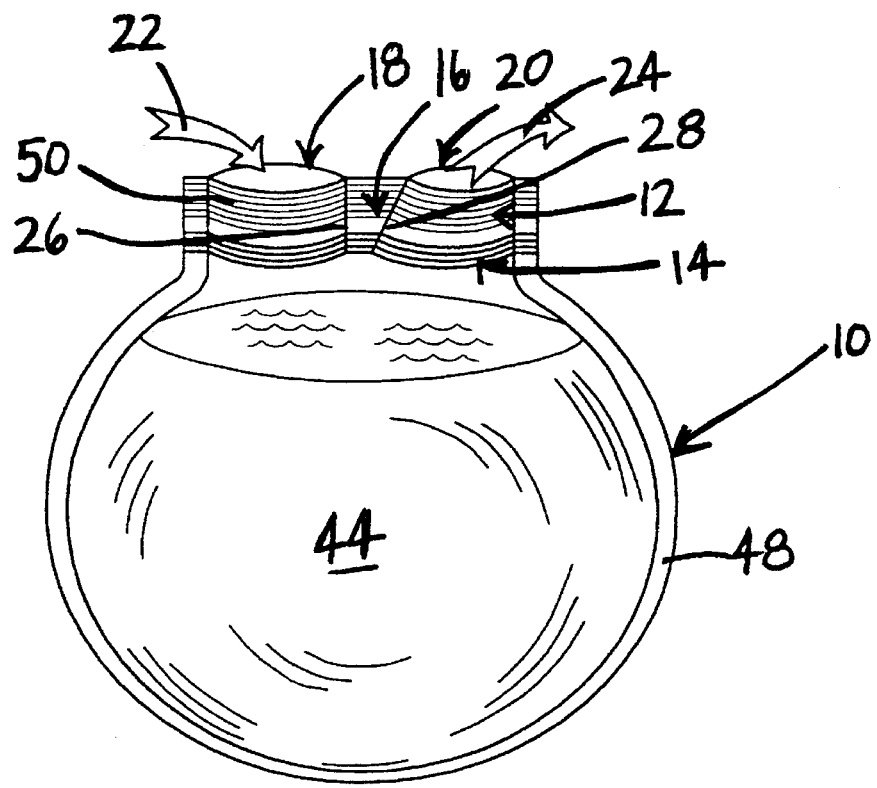
FIG. 2 is a pictorial view of the lens and shows it in a nearly-filled condition.

Both openings 18, 20 are open when the lens 10 is filled. Arrow 22 in FIG. 2 illustrates how water enters the lens 10 through opening 18, while arrow 24 illustrates the exit of air from the lens as it is being filled. This is important as it facilitates filling the lens. It would be possible, of course, to reverse the openings if desired, i.e., use opening 20 as the inlet and opening 18 as the outlet.

Figure 3:
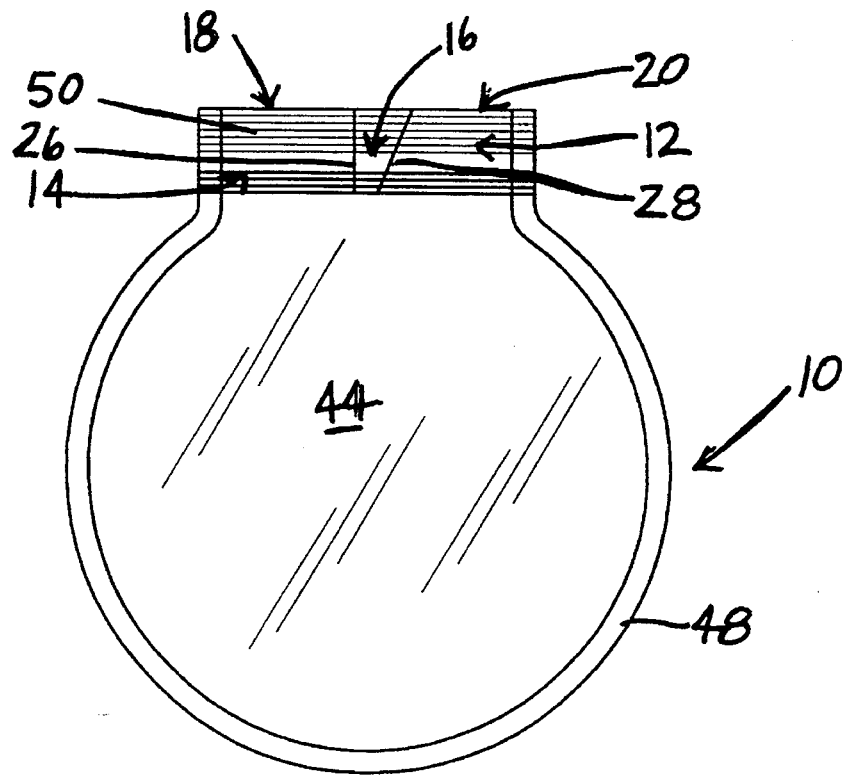
FIG. 3 is a top-plan view of the lens shown in FIGS. 1 and 2.
Figure 4:
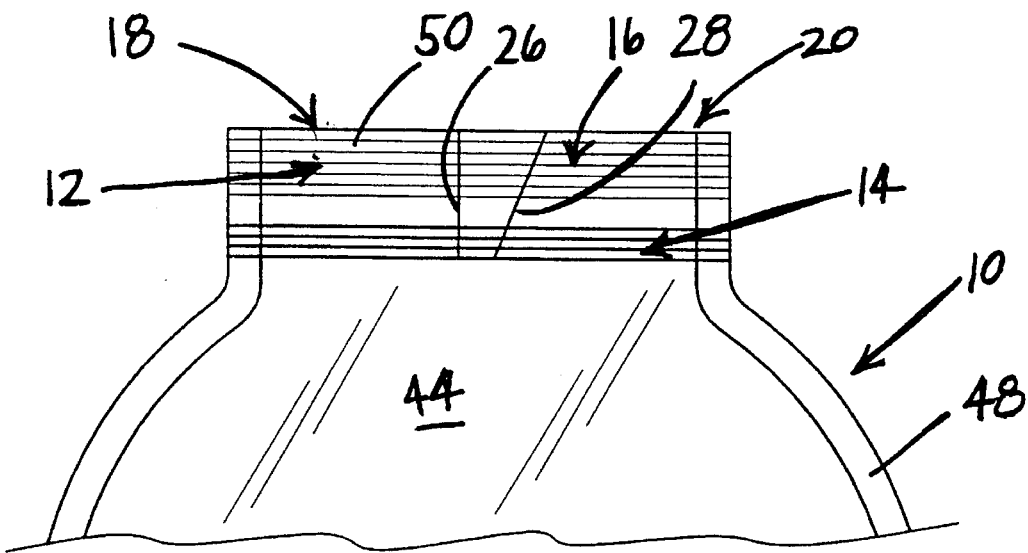
FIG. 4 is an enlarged sectional view of the inlet and outlet openings of the lens.

Referring now to FIGS. 3 and 4, the heat-sealed region 16 preferably has a straight side edge 26 and an angled side edge 28. The angled edge 28 diverges outwardly from the straight edge. This causes the outlet opening 20 to converge slightly from inside the lens to outside, as shown in FIG. 2. The net effect is that the angled edge 28 creates a spout for pouring water from the lens when it is desired to empty it. Both openings 18, 20 are open during emptying in order to expedite the flow of water from the lens 10.

Figures 6, 7:
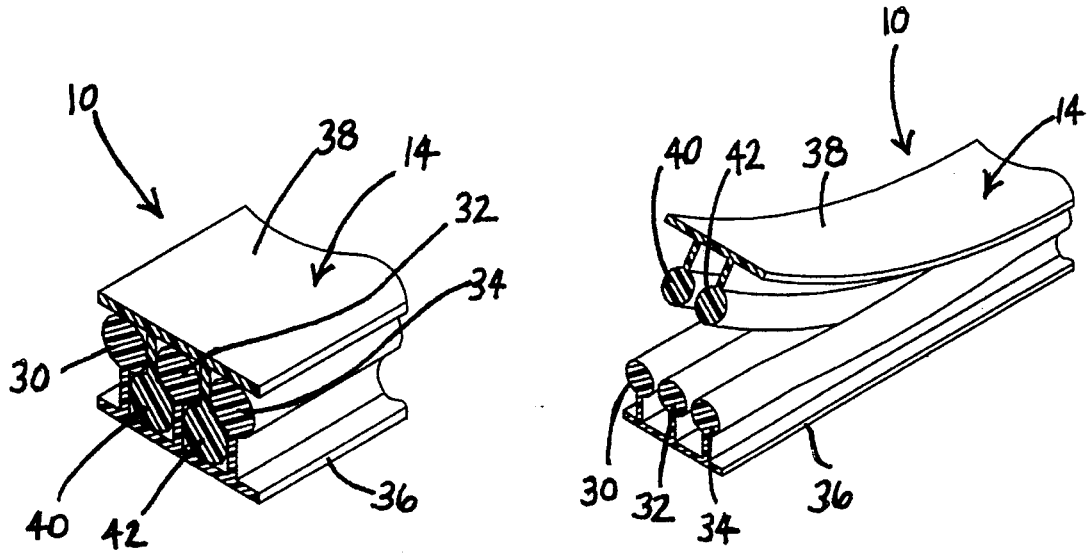
FIG. 6 is an enlarged cross-sectional view showing the channel-lock seam used to open and close the lens inlet and outlet openings.
FIG. 7 is an enlarged sectional view, showing the opening of the channel-lock seam, and is taken along line 7—7 in FIG. 5.

Referring to FIGS. 6 and 7, the channel-lock seam 14 is conventional in design and would be well known to anyone who has ever used a conventional sandwich bag. The channel lock has three elongated beads 30, 32, 34, connected to one side 36 of the seam, while the other side 38 has a pair of similar beads 40, 42. Beads 40, 42 slip between beads 30, 32, 33 and are captured in position, as shown in FIG. 6, when seam sides 36, 38 are closed together.

In preferred form, the lens is constructed from two symmetrical sheets of polyethylene plastic 44, 46 (see FIG. 5). Each half 44, 46 has the same natural parabolic curvature. When combined together, the halves 44, 46 cooperatively assume the convex shape of the lens 10 when filled with water. The halves 44, 46 are sealed together along a radial edge, which is indicated at 48.

The edge region 12 has a series of corrugations 50 extending along the outermost boundary of the edge region. The corrugations stiffen the inlet and outlet openings 18, 20 during the lens filling and emptying process.

The radius and thickness of the lens may vary. Preferably, it should have a 1 to 3 inch radius. Size is not particularly germane to my design.

The preceding description is not to be taken in a limiting sense. It is conceivable that further embodiments or improvements to the lens, as disclosed above, may be developed subsequent to the filing date of this document. Accordingly, the invention is to be defined and limited only by the subjoined patent claim or claims, the interpretation of which is to be made in accordance with the established doctrines of patent claim interpretation.

What is claimed is:

1. A lens, comprising: a pouch made of a flexible, light-transparent material, the pouch having inlet and outlet openings for filling the pouch with a light-transparent liquid, and wherein the light-transparent material assumes the shape of a generally circular, convex lens when the pouch is substantially filled with the liquid, and further, the inlet and outlet openings are positioned adjacent each other and substantially adjacent the outer radial periphery of the filled pouch, and wherein the inlet and outlet openings are each defined by a channel-lock seam.

2. The lens of claim 1, wherein one of the openings is shaped so that, when it is in an open condition, the cross-sectional area of the outlet opening converges outwardly relative to the pouch.

3. A lens, comprising: a pouch made of a flexible, light-transparent material, the pouch having inlet and outlet openings for filling the pouch with a light-transparent liquid, and wherein the light-transparent material assumes the shape of a generally circular, convex lens when the pouch is substantially filled with the liquid, and further, the inlet and outlet openings are positioned adjacent each other and substantially adjacent the outer radial periphery of the filled pouch and wherein the inlet and outlet openings are defined by a single channel-lock seam positioned substantially adjacent the outer radial periphery of the pouch, the seam having a permanently sealed portion dividing the seam into two sections respectively corresponding to the inlet and outlet openings, the openings being independently openable and closeable.

4. A lens, comprising: a pouch made of a flexible, light-transparent material, the pouch having inlet and outlet openings for filling the pouch with a light-transparent liquid, and wherein the light-transparent material assumes the shape of a generally circular, convex lens when the pouch is substantially filled with the liquid, and further, the inlet and outlet openings are positioned adjacent each other and substantially adjacent the outer radial periphery of the filled pouch., and wherein the inlet and outlet openings are defined by an edge region of the pouch, the edge region having a substantially rectangular shape that is coextensive with a portion of the outer radial periphery of the pouch, the edge region having a lengthwise channel-lock seam, and a sealed portion dividing the seam and edge region into two sections respectively corresponding to the inlet and outlet openings, the sealed portion having a straight side and an angled side that diverges outwardly from the straight side, to thereby define an opening that converges outwardly relative to the pouch.

\* \* \* \* \*